United States Patent Office 2,709,203
Patented May 24, 1955

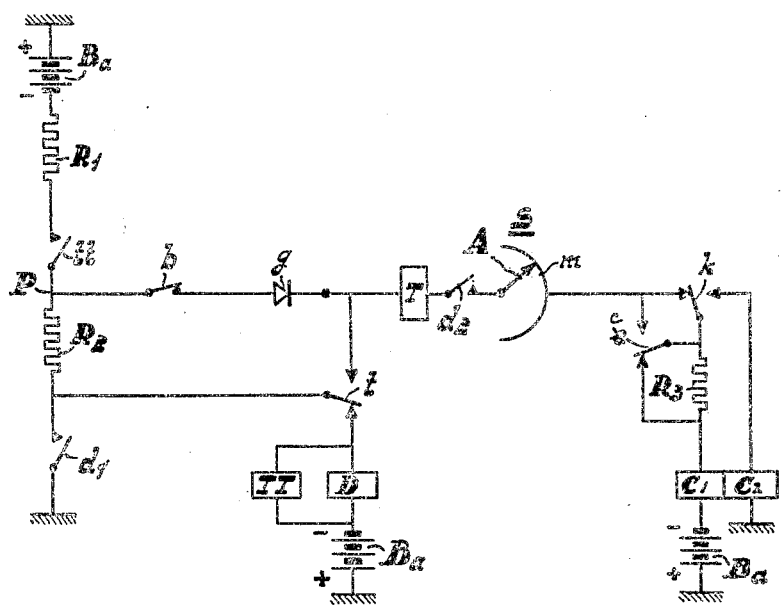

2,709,203

DEVICE FOR USE IN AUTOMATIC SIGNALLING SYSTEMS FOR ENGAGING AN APPARATUS

Robert Bertold Buchner, Hilversum, Netherlands, assignor to Hartford National Bank and Trust Company, Hartford, Conn., as trustee Application December 18, 1950, Serial No. 201,321

Claims priority, application Netherlands December 31, 1949

2 Claims. (Cl. 179—18)

This invention relates to devices for use in automatic signalling systems, for example telephone systems, for engaging an apparatus and for testing the voltage of a marking point associated with this apparatus.

The apparatus to be engaged may be constituted, for example, by a register or marker in a cross-bar system, a calling line connected to an outlet of a line finder, or a switch in a subsequent selecting stage which is connected to an outlet of a group selector etc.

As a rule, such apparatus are adapted to be engaged in different ways such, for example, as by means of outlets of different switches.

In known circuit-arrangements, the apparatus has associated with it a marking point, the voltage of which is a criterion as to whether the apparatus is busy, or may be or must be made busy. This voltage may be tested in the different ways by means of the test devices which control the operation of busying the apparatus.

In said known circuit-arrangements the marking point is, as a rule, connected by way of a resistance to a first point of supply, for example a first terminal of a battery, the marking voltage being tested by means of a relay, of which a winding, at least during the test, is connected between the marking point and a second point of supply, for example a second terminal of the battery. When the test device finds a voltage at the marking point, which is an indication that the apparatus is not busy, the relay in the circuit formed between the first and second points of supply responds and short-circuits part of its winding. Thus, the resistance connected to the marking point is traversed by a current whereby the marking point assumes a voltage by which the apparatus is marked as busy and a relay of another test device, which subsequently is connected to the marking point and the winding of which, during the test, is connected in parallel to the low-ohmic part of the winding of the first test relay, cannot respond.

As a rule, the resistance connected between the marking point and the first point of supply is realised in the form of a winding of a relay, for example a busy relay or a cut-off relay, of an outlet stage of the switch.

It is desirable that the test relay responds as quickly as possible and varies the marking voltage, since otherwise there is involved the risk that two test devices testing the marking voltage approximately at the same moment may not receive the indication that the apparatus is busy and thus both of them engage the apparatus.

When an apparatus needs to be made busy by a quick-action switch, it is for still another reason necessary that the test device shall respond rapidly, viz. to avoid the possibility that the switch to be adjusted to a predetermined outlet cannot be stopped with sufficient rapidity and stops only on a subsequent outlet.

In order to ensure rapid response of the device, the test relay upon response is required to be materially overexcited, that is to say the number of ampere turns must be large. The low-ohmic part of the winding must have sufficient turns, so that in the busy condition the relay remains held and is not released when the test relay of a second switch, parallel to the first relay, tests the voltage of the busy marking point. Conversely, the second relay must not respond when an outlet is engaged. This implies that the ratio between the resistances of the high-ohmic part and the low-ohmic part of the winding of the test relay must be comparatively high. However, if the high-ohmic part of the winding has many turns, the inductance has a high value and the quickness of response is adversely affected. Consequently, in known circuit-arrangements, the numbers of ampere turns required to hold the relay and to produce a certain overexcitation cannot be chosen at will independently of one another, so that a compromise must be sought.

This disadvantage does not occur, in the device according to the invention, the conditions of responding and holding being completely separate, so that the extent of overexcitation may be chosen at will.

In this device according to the invention, similarly as in known circuits, the marking point is connected by way of a resistance to a first point of supply, a winding of the relay, during the test, being connected between the marking point and a second point of supply. When the relay responds, that extremity of the winding which was connected to the second point of supply is connected to a third point of supply, the potential of which with respect to those of the first and second points of supply has a value such that the potential of the second point of supply lies between those of the first and third points of supply.

When, after response of the relay, a second test device is connected to the marking point, different electromotive forces are active in the circuits of the windings of the relays. Consequently, contrary to known circuits, the ratio between the currents traversing the windings of the relays is not determined solely by the ratio between the resistances operative in the circuits.

It is thus possible for the current through the winding of the second relay to be reduced completely to zero. The resistanace values of the elements of the circuits are preferably chosen to be such that, in the excited condition of the relay, the potential of the marking point lies between the potentials of the second and third points of supply, a rectifier being connected in series with the winding of the relay.

The invention will now be explained more fully with reference to the accompanying drawing showing, by way of example, one embodiment thereof.

The figure shows in schematic and simplified form a part of a circuit-arrangement for stepping a group selector S to a contact of a free outlet. Of the selector S, only the wiper A and the contact bank m wiped thereby are shown. The character D indicates the rotary magnet of the switch. When the selector is engaged, make contacts $d_1$ and $d_2$ of a busy relay (not shown) are closed and a back contact $b$ of a shunting relay (not shown) opens. After the selector has been stepped to the first contact of the desired group in a known manner, which is immaterial here, back contact $b$ is closed and the switch selects a contact of a free outlet in this group.

The marking contacts of free outlets are connected to the negative terminal of a battery $B_a$ by way of a back contact $k$, which is closed if the selector in the subsequent selecting stage occupies its rest position, a back contact $c$ and a winding $C_1$ of the busy relay C of the subsequent selecting stage. The positive terminal of battery $B_a$ is connected to earth. The rotary magnet D and the auxiliary relay TT are now energised in a circuit extending from earth via make contact $d_1$, a back contact $t$ of test relay T and the windings of D and TT respectively to the negative terminal of battery $B_a$.

Consequently, the selector is set into motion. The quick-action test relay T is provided with a single winding, the number of turns of which may be, for example, 3000 and the resistance 100 ohms, and with a single change-over contact $t$. One extremity of the winding is connected by way of make contact $d_2$ of the busy relay (not shown) to the wiper A of the selector, the other extremity being connected by way of a rectifier $g$ and back contact $b$ to a point P on the voltage divider which is connected between the negative terminal of the battery and earth and which is constituted by a resistance $R_1$, a make contact $tt$ of relay TT, a resistance $R_2$ and make contact $d_1$. The voltage of the battery is, for example, 60 volts and the resistances $R_1$ and $R_2$ may have values of 500 ohms and 100 ohms respectively. The voltage of point P is in this case $-10$ volts with respect to earth.

The rectifier $g$ has a polarity such that the current flows only in the direction from point P to the winding of relay T. As will appear more fully hereinafter, marking contacts of busy outlets have a potential of approximately $-2.5$ volts with respect to earth. Consequently, so long as the wiper A is in contact with marking contacts of busy outlets, the rectifier is cut off and current does not flow through the wiper.

If, however, the selector reaches a free outlet, the rectifier becomes conducting and relay T is energised in a circuit extending from point P on the potentiometer via back contact $b$, rectifier $g$, the winding of relay T, make contact $d_2$, wiper A and marking contact $m$ of the selector, back contact $k$, back contact $c$ and winding $C_1$ of relay C to the negative terminal of the battery.

If the winding $C_1$ has a resistance of 550 ohms, a current of 68 milliamps. flows at this stage through the winding of relay T, which corresponds to a magnetization of 204 ampere turns. The relay T subsequently responds very quickly. Back contact $t$ interrupts the magnetization circuit of the rotary magnet D, so that the selector stops. Relay T connects, by way of make contact $t$, the left-hand extremity of its winding by way of make contact $d_1$ to earth, so that rectifier $g$ is cut off.

Owing to the release of relay TT, make contact $tt$ in the potentiometer is opened (for the purpose of saving current), the line wires being connected to the subsequent selecting stage in the conventional manner, which is not shown here.

Now, a current of 92 milliamps. flows through the winding of relay T, so that the voltage of the marking contact is reduced to $-9.2$ volts with respect to earth. This voltage is higher than the voltage ($-10$ volts) of the point P on the potentiometer of any other selector searching at this moment a free outlet within the same group, so that if the other selector at this moment reaches the outlet caught by the first selector, the recifier in the other selector remains cut off and its test relay cannot respond.

The outlet is thus engaged by the response of relay T.

In order to minimise the inductance in the excitation circuit of relay T, relay C comprises a short-circuited winding. Consequently, relay C will respond slowly, but this is not objectionable, the outlet being fully marked as busy by the response of relay T.

Relay C will thus respond, some time after relay T, in the excitation circuit extending from point P via back contact $b$, rectifier $g$, winding T, make contact $d_2$, wiper A, marking contact $m$, back contact $k$, back contact $c$, winding $C_1$ of relay C to the negative terminal of the battery $B_a$.

Make contact $c$ bridges back contact $k$. Due to the opening of back contact $c$, resistance $R_3$ having a value of 1000 ohms is connected in series with the excitation circuit of the relays T and C. After the selector in the subsequent selecting stage has left its position of rest, the winding $C_2$ of relay C is connected in parallel to the winding of relay T by the make contact $k$.

The winding $C_2$ is wound in the opposite sense to and with an equal number of turns as the winding $C_1$ and has a resistance of 200 ohms.

A current of 37 milliamps. flows through the winding $C_1$ and a current of 25 milliamps. through the winding of relay T, the voltage of the marking contact being $-2.5$ volts with respect to earth.

The holding current of relay T is adjustable to a minimum value, since another switch testing the busy outlet cannot extract current from the relay T, this in contradistinction to known circuit-arrangements.

After the call is over, the busy relay is released, so that make contact $d_2$ opens. The windings $C_1$ and $C_2$ of relay C are now connected in series with one another and with resistance $R_3$, between the poles of the battery and since the windings are wound in opposite senses and have equal numbers of turns, relay C is released, although with retardation, due to the presence of the short-circuited winding. However, there is no risk of the outlet being caught by another selector before relay C has been released, since at this stage the marking contact has a voltage of $-6.8$ volts with respect to earth and the outlet is thus still marked as busy.

It has been found possible in practice to control a switch operating at a speed of 350 outlets per second, in a manner perfeectly secure in operation with the use of the arrangement described.

The arrangement may be modified in different ways within the scope of the invention.

Thus, for example, it is not necessary to utilise a potentiometer $R_1$, $R_2$. The point P may alternatively be connected directly to a tapping on the battery. Furthermore, instead of utilising the described outlet circuits connected to the marking contacts, use may be made of any other circuit-arrangement suitable for the purpose.

What I claim is:

1. In an automatic signalling system, a circuit-arrangement for engaging an apparatus having a marking point therein and for testing the voltage of said marking point, said arrangement comprising a voltage supply having first, second and third points of substantially fixed potential in which the potential of the second point falls between that of the first and third points, a resistance connecting the marking point to said first point, a testing relay for said marking point having only a single winding, said winding requiring a predetermined minimum energizing potential, and a switch arranged to be actuated by said winding when energized, means responsive during testing for connecting said winding between said marking point and said second point whereby said winding is energized when said marking point exhibits a voltage representing a free condition, and means connecting the end of said winding remote from said marking point through said switch to said third point to apply when said switch is actuated a potential from said third point to said marking point having a value with respect to said second point less than said minimum energizing potential.

2. A circuit-arrangement as set forth in claim 1, further including a rectifier interposed between said winding and said second point, said rectifier having a cut-off characteristic which renders said rectifier non-conductive when said winding is connected between said marking point and said second point and the voltage between said last-named points is less than said minimum energizing potential.

References Cited in the file of this patent

UNITED STATES PATENTS

| Re. 22,861 | Deakin | Apr. 8, 1947 |
|---|---|---|
| 2,093,242 | Humphries | Sept. 14, 1937 |
| 2,336,861 | Gray | Dec. 14, 1943 |
| 2,416,086 | Christian | Feb. 18, 1947 |
| 2,416,109 | Long | Feb. 18, 1947 |
| 2,576,097 | Bray et al. | Nov. 27, 1951 |